US011973671B1

(12) United States Patent
Lee et al.

(10) Patent No.: US 11,973,671 B1
(45) Date of Patent: Apr. 30, 2024

(54) SIGNAL BASED NODE RELATIONSHIP IDENTIFICATION

(71) Applicant: International Business Machines Corporation, Armonk, NY (US)

(72) Inventors: Cheng-Ta Lee, Cumming, GA (US); Iosif Viorel Onut, Ottawa (CA); Russell Couturier, Worcester, MA (US); Mattias Johansson, Dunwoody, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/987,254

(22) Filed: Nov. 15, 2022

(51) Int. Cl.
*H04L 43/062* (2022.01)
*H04L 43/067* (2022.01)
*H04L 43/0817* (2022.01)

(52) U.S. Cl.
CPC .......... *H04L 43/062* (2013.01); *H04L 43/067* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 7,769,024 B1 * | 8/2010 | Orr | H04L 45/74 370/395.32 |
| 9,942,252 B1 | 4/2018 | Kondaveeti et al. | |
| 2009/0089619 A1 * | 4/2009 | Huang | H04L 12/66 714/37 |
| 2015/0256465 A1 * | 10/2015 | Mack-Crane | H04L 41/40 709/232 |
| 2021/0297427 A1 | 9/2021 | Narula et al. | |
| 2022/0368709 A1 * | 11/2022 | Kaye | H04L 63/1425 |

OTHER PUBLICATIONS

Kim et al., Automatically Attributing Mobile Threat Actors by Vectorized ATT&CK Matrix and Paired Indicator, Sensors, Sep. 29, 2021.
Reuille et al., Design to Discover: Security Analytics with 3D Visualization Engine, Virus Bulletin Conference, pp. 233-237, Sep. 2014.
Wikipedia, Cross-correlation, 2022, https://en.wikipedia.org/wiki/Cross-correlation#:~:text=In%20signal%20processing%2C%20cross-correlation.

(Continued)

*Primary Examiner* — Anh Nguyen
(74) *Attorney, Agent, or Firm* — Garg Law Firm, PLLC; Rakesh Garg; Anthony Mauricio Pallone

(57) ABSTRACT

A generated signal is injected into a first network node in a set of network nodes. The generated signal comprises a predetermined pattern, the predetermined pattern comprises a plurality of time periods, wherein during each time period in the plurality of time periods a first data traffic is prevented from exiting the first network node. By monitoring data flow within the set of network nodes while the generated signal is being injected, a correlation with the generated signal is detected, the correlation correlating a second network node with the first network node. The second network node is associated with the first network node. Responsive to the association, traffic from the second network node to the set of network nodes is blocked.

25 Claims, 5 Drawing Sheets

(56) References Cited

OTHER PUBLICATIONS

Kennedy, A New Statistical Measure of Signal Similarity, Mar. 2007.
Houmansadr et al., BotMosaic: Collaborative network watermark for the detection of IRC-based botnets, The Journal of Systems and Software, vol. 86, Issue 3, Nov. 9, 2012, pp. 707-715.
Yu et al., Semi-supervised Time Series Modeling for Real-Time Flux Domain Detection on Passive DNS Traffic, P. Perner (Ed.): MLDM 2014, LNAI 8556, pp. 258-271, 2014.
IBM X-Force Exchange, Chalubo—DDOS Botnet Targeting The United States, 2022, https://exchange.xforce.ibmcloud.com/collection/Chalubo-DDos-Botnet-Targeting-The-United-States-90da6b96cd64b8b8007f4d72cff47bec.

* cited by examiner

SIGNAL BASED NODE RELATIONSHIP IDENTIFICATION

BACKGROUND

The present invention relates generally to a method, system, and computer program product for network node management. More particularly, the present invention relates to a method, system, and computer program product for signal based node relationship identification.

An Indicator of Compromise (IoC) is an artifact observed on a network or in an operating system that indicates a security breach. Some examples of IoCs are Internet Protocol (IP) addresses, Universal Resource Locators (URLs), domain names, file hashes, and other identifiers of sources of online activities. A botnet is a group of devices, each of which executes a software application called a bot. Each device in the botnet communicates with other devices in the botnet via a network such as the Internet. Botnets are often used to perform malicious tasks such as exfiltrating data from a computer system, sending spam messages, and performing distributed denial-of-service attacks on other systems in a computer network. Botnets are typically controlled using a command and control software application executing on a botnet command and control server, and typically send data to the command and control server or to a different location.

In networked data communication, a network node, or node, is either a redistribution point or a communication endpoint for data, or traffic, being communicated. Some examples of network nodes are switches, bridges, and host computers. Host computers are typically identified by an IP address. A domain is a named grouping of computer systems identified by a domain name. A domain name is a label identifying an area of administrative control within a network such as the Internet. The Domain Name System (DNS) is a naming system used to identify computer systems reachable through the Internet or another IP network. Resource records within the DNS associate domain names with other information, and are typically used to map a domain name (e.g., www.example.com) to a particular numerical IP address (e.g., 93.184.216.34). DNS uses a query/resolution sequence, in which a query for an IP address is resolved by supplying the requested address. An enforcement point is a network node that controls access and implements authorization decisions.

The illustrative embodiments recognize that, although identifying relationships between network elements represented by IoCs is critical in threat investigations, the task is complex. Botnets and other malware generate new network domains with which to communicate as soon as existing domains are blocked. Fast-changing domains also make it difficult to link new domains to suspicious IP addresses, because the mapping between domains and IP addresses keeps changing, Malware-as-a-service software applications also generate new malware variants to bypass existing detection techniques. Further, identifying a botnet command and control server is often insufficient to thwart a botnet, because the malware itself is hosted on another domain. Thus, even when one node in a botnet or other malware network is identified, by the time other nodes in the network have been identified, the network is likely to have changed.

The illustrative embodiments also recognize that existing traffic analytics based on DNS query/resolution patterns are insufficient to identify network node relationships when large numbers of nodes are being analyzed. For example, a pattern without sufficient characteristics might match too many other patterns, resulting in too many possibly-related network nodes to further analyze effectively.

Thus, the illustrative embodiments recognize that there is an unmet need to identify relationships between network nodes, to mitigate threats and for other network management purposes.

SUMMARY

The illustrative embodiments provide a method, system, and computer program product. An embodiment includes a method that injects, into a first network node in a set of network nodes, a generated signal, the generated signal comprising a predetermined pattern, the predetermined pattern comprising a plurality of time periods, wherein during each time period in the plurality of time periods a first data traffic is prevented from exiting the first network node. An embodiment detects, by monitoring data flow within the set of network nodes while the generated signal is being injected, a correlation with the generated signal, the correlation correlating a second network node with the first network node. An embodiment associates the second network node with the first network node. An embodiment blocks, responsive to the association, traffic from the second network node to the set of network nodes. Thus, an embodiment provides a method of signal based node relationship identification.

In another embodiment, the first data traffic comprises all data traffic from the first network node. Thus, an embodiment provides a method of signal based node relationship identification that blocks all traffic from the second network node to the set of network nodes.

In another embodiment, the first data traffic comprises a subset of all data traffic from the first network node. Thus, an embodiment provides a method of signal based node relationship identification that blocks a subset of all traffic from the second network node to the set of network nodes.

In another embodiment, detecting the correlation with the generated signal comprises computing a cross-correlation between a first time series and a second time series, the first time series comprising data flow data from the first network node during the injecting, the second time series comprising data from the second network node. Thus, an embodiment detects the correlation with the generated signal by computing a cross-correlation.

Another embodiment further includes injecting, onto the network node while traffic from the second network node is blocked, a second generated signal, the injecting comprising preventing a second data traffic from exiting the first network node in a second predetermined pattern; detecting, by monitoring data flow within the set of network nodes while the second generated signal is being injected, a second correlation with the second generated signal, the second correlation correlating a third network node with the first network node; and associating the third network node with the first network node. Thus, an embodiment provides a method that further associates a third network node with the first network node.

Another embodiment further includes detecting, by monitoring processor usage within the set of network nodes while the generated signal is being injected, a third correlation with the generated signal, the third correlation correlating a fourth network node with the first network node; and associating the fourth network node with the first network node. Thus, an embodiment provides a method that further associates a fourth network node with the first network node.

Another embodiment further includes detecting, by monitoring outgoing connection requests from the first network node while the generated signal is being injected, a fourth correlation with the generated signal, the fourth correlation correlating a fifth network node with the first network node; and associating the fifth network node with the first network node. Thus, an embodiment provides a method that further associates a fifth network node with the first network node.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
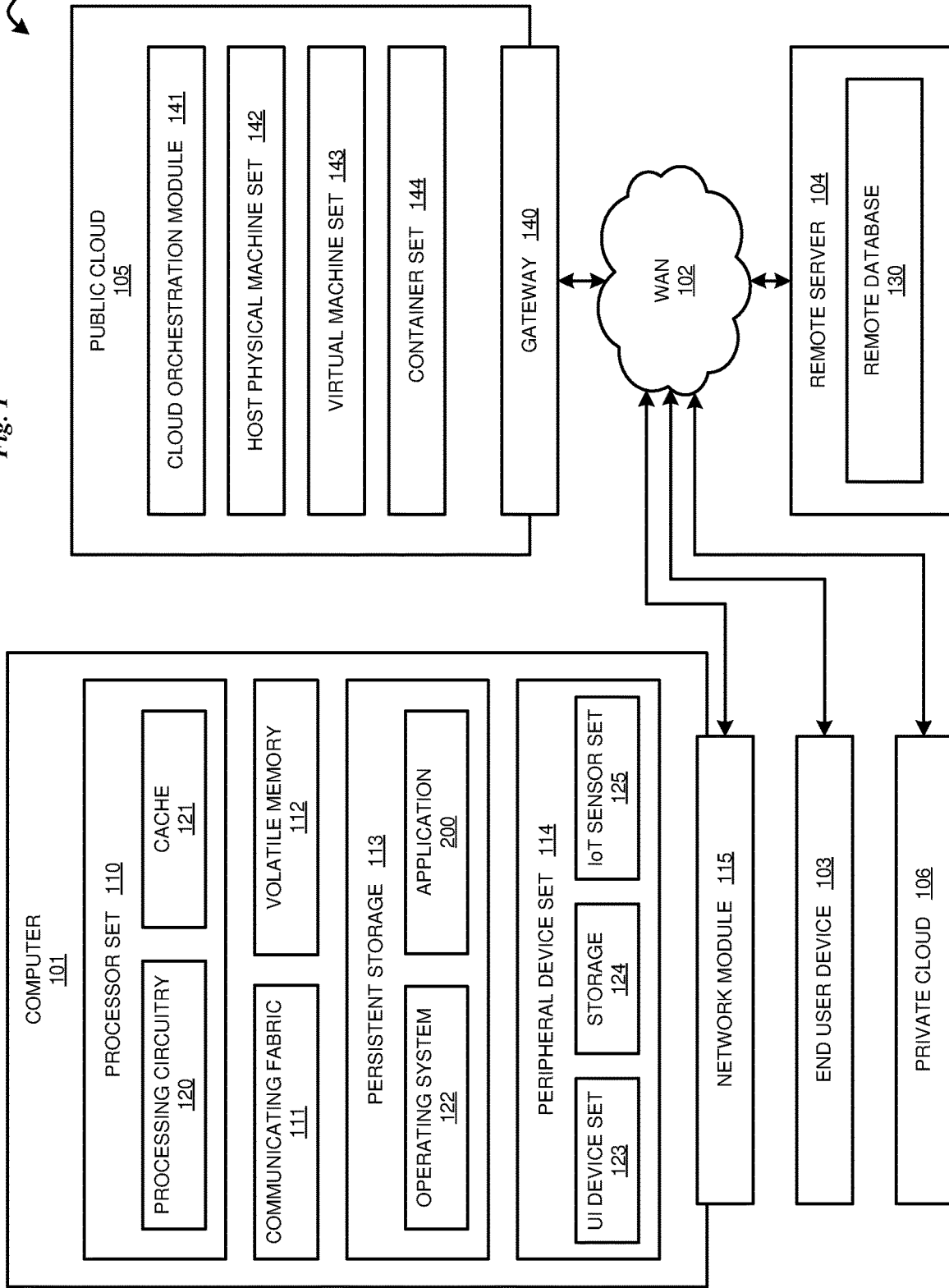
FIG. 1 depicts an example diagram of a data processing environments in which illustrative embodiments may be implemented.

The illustrative embodiments recognize that there is an unmet need to identify relationships between network nodes, to mitigate threats and for other network management purposes. The illustrative embodiments recognize that the presently available tools or solutions do not address these needs or provide adequate solutions for these needs. The illustrative embodiments used to describe the invention generally address and solve the above-described problems and other problems related to signal based node relationship identification.

An embodiment can be implemented as a software application. The application implementing an embodiment can be configured as a modification of an existing network management system, as a separate application that operates in conjunction with an existing network management system, a standalone application, or some combination thereof.

Particularly, some illustrative embodiments provide a method that injects a generated signal into a first network node by blocking and unblocking data traffic from the first network node in a predetermined pattern, detects a correlation with the generated signal by monitoring data flow within a set of network nodes while the generated signal is being injected, the correlation correlating a second network node with the first network node, and associates the second network node with the first network node.

An embodiment receives network node data. Network node data is data of one or more nodes in a network an embodiment is analyzing.

An embodiment generates a signal to be injected into a network node. The signal indicates when data traffic is to be blocked and unblocked from exiting a network node. Thus, to generate a signal, one embodiment uses a pre-defined time interval—e.g., every five minutes. To generate a signal, another embodiment uses a set of pre-defined time intervals—e.g., three minutes, then ten minutes, then twenty minutes, then five minutes, then repeating the entire sequence. To generate a signal, another embodiment uses one or more randomly-generated time intervals, using time interval values generated using a pseudo-random number generator. The signal also indicates the traffic volume to be blocked from a network node. Thus, to generate a signal, one embodiment uses a pre-defined traffic volume—e.g., 100%. To generate a signal, another embodiment uses a set of pre-defined traffic volumes—e.g., 50%, then 75%, then 100%, then repeating the entire sequence. To generate a signal, another embodiment uses one or more randomly-generated traffic volume percentages, using time interval values generated using a pseudo-random number generator. Another embodiment generates a signal to be injected into multiple network nodes, by combining generated signals injected into individual nodes. In one embodiment, the signal ends after a predefined time period, while in another embodiment the signal does not end until stopped.

An embodiment injects the generated signal into a first network node in a network an embodiment is analyzing, by blocking, or preventing, data traffic from exiting the first network node in the predetermined pattern of the generated signal. For example, an embodiment might block all data traffic from a domain to any other domain for one minute, every five minutes. As another example, an embodiment might block, then unblock, all traffic from an IP address to any other IP address, switching between the blocked and unblocked states at time intervals of three minutes, then ten minutes, then twenty minutes, then five minutes, then repeating the sequence. As another example, an embodiment might block 30% of the traffic from a particular IP address to another particular IP address for one hour, then block 50% of the traffic between the same IP addresses for a second hour. As another example, an embodiment might block all United States traffic from a domain for one hour, then block all worldwide traffic from that domain for a second hour. As another example, an embodiment might block a particular type of traffic, such as an outgoing connection request or a DNS lookup request. As will be apparent, the examples provided are only examples, and other combinations of node type, time interval, traffic volume, and number of nodes into which the signal is injected are also possible and contemplated within the scope of the illustrative embodiments.

An embodiment monitors data flow within the set of network nodes while the generated signal is being injected, to detect effects of the injected signal.

From the monitored data flow, an embodiment detects a correlation with the generated signal. The correlation correlates, or identifies a relationship between, a second network node and the node into which the signal was injected. An embodiment uses a presently available statistical technique such as computing a cross-correlation to identify a similarity, above a threshold value, between the generated signal and a second signal. Cross-correlation is a measure of similarity of two series of data as a function of the displacement of one series relative to the other. Another embodiment uses another presently available statistical technique to quantify the degree of alignment, correlation, or coincidence between two or more time-or space-dependent waveforms. In one embodiment, the second signal comprises traffic data from the second network node. For example, if the signal is to block traffic to a particular IP address, the same traffic drops might be observed at the same timestamps at Domain D, indicating that Domain D typically is related to Domain A. In another embodiment, the second signal comprises a particular type of data flow from the second network node, such as an outgoing connection request to a specific IP address. In another embodiment, the second signal comprises a particular type of system usage data from the second network node, such as processor usage. For example, if the signal is to block traffic from IP address A and there are corresponding drops in processor usage in another node, it is likely that a process running on the other node is dependent on traffic from IP Address A, and thus the two nodes are related.

Another embodiment uses a presently available statistical technique to identify a reversed pattern between the generated signal and a second signal. For example, if the signal is to block traffic from Domain A, traffic spikes might be observed at the same timestamps at Domain E. As another example, if the signal is to block traffic from IP address A, corresponding spikes in outgoing connection requests to IP Address B might be observed. A reversed pattern might be observed if a threat actor has a secondary infrastructure, so that blocking traffic from one node in the primary infrastructure drives traffic to one or nodes in a secondary infrastructure.

Another embodiment uses a presently available statistical technique to identify a time shift between the generated signal and a second signal. For example, if the signal is to periodically block traffic from Domain A, a traffic drop of the same frequency might be observed at Domain F. A time shift might be observed due a delayed reaction to the injected signal.

Another embodiment uses a presently available statistical technique to identify an effect of injecting the generated signal at a particular geographical location. For example, due to an adversary's particular infrastructure, the effect of blocking traffic from a node in the United States might be different from the effect of blocking traffic from a node in the United Kingdom.

Another embodiment uses a presently available statistical technique to identify an effect of injecting the generated signal on one or more network nodes already known to be malicious. For example, if traffic from one domain is blocked, it may take a botnet some time to deploy backup domains. However, known bad domains and the known relationships between them can be leveraged to create a model that recognizes sufficiently similar behavior in the time-series data resulting from an injected signal.

Another embodiment monitors all data flow within a set of network nodes to identify an effect of injecting the generated signal. Another embodiment monitors a portion of data flow within a set of network nodes, or all or a portion of data flow to or from particular nodes, to identify an effect of injecting the generated signal. Another embodiment monitors a particular type of data flow, such as an outgoing connection request. Another embodiment monitors data of a network node, such as processor usage of a node.

An embodiment associates the second network node with the first network node in a data structure maintaining data of relationships between nodes.

An embodiment uses the relationship data to select a network node into which to inject a signal in a subsequent iteration of the node relationship identification process described herein. For example, one iteration of signal injection might identify a group of IoC candidates, then additional iterations used to inject more signals in different locations or patterns, to eliminate IoC candidates or confirm others as actual IoCs with added confidence.

An embodiment uses one or more iterations of the node relationship identification process described herein to identify additional compromised network nodes as a botnet reconfigures itself. For example, a threat actor usually compromises multiple endpoints, so that when one endpoint becomes inaccessible, threat actors use another compromised endpoint to continue an attack. Botnets typically randomly select a master node from all the currently-compromised nodes. As a result, blocking traffic from one node can trigger the master node selection process, resulting in related telemetry from other nodes already in the botnet. Thus, an embodiment blocks traffic from exiting the second network node and injects a second generated signal onto the first network node while the second node is blocked, in a manner described herein. An embodiment detects, by monitoring data flow within the set of network nodes, a correlation between the second generated signal and a third network node in a manner described herein, and associates the third node with the first node.

An embodiment uses the relationship data to reconfigure a network to prevent one or more compromised nodes from affecting other nodes on the network. For example, once compromised nodes of a botnet are identified, traffic from the compromised nodes can be blocked, or a software reconfiguration can be performed on the compromised nodes to remove the botnet software.

The manner of signal based node relationship identification described herein is unavailable in the presently available methods in the technological field of endeavor pertaining to network management. A method of an embodiment described herein, when implemented to execute on a device or data processing system, comprises substantial advancement of the functionality of that device or data processing system in injecting a generated signal into a first network node by blocking and unblocking data traffic from the first network node in a predetermined pattern, detecting a correlation with the generated signal by monitoring data flow within a set of network nodes while the generated signal is being injected, the correlation correlating a second network node with the first network node, and associating the second network node with the first network node.

The illustrative embodiments are described with respect to certain types of nodes, domains, IP address, network traffic, time intervals, traffic volume adjustments, delays, blockages, responses, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to the figures and in particular with reference to FIG. 1, this figure is an example diagram of a data processing environments in which illustrative embodiments may be implemented. FIG. 1 is only an example and are not intended to assert or imply any limitation with regard to the environments in which different embodiments may be implemented. A particular implementation may make many modifications to the depicted environments based on the following description. FIG. 1 depicts a block diagram of a network of data processing systems in which illustrative embodiments may be implemented. Computing environment 100 contains an example of an environment for the execution of at least some of the computer code involved in performing the inventive methods, such as application 200. Application 200 implements a signal based node relationship identification embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Application 200 executes in any of computer 101, end user device 103, remote server 104, or a computer in public cloud 105 or private cloud 106 unless expressly disambiguated. Application 200 identifies network node relationships in public cloud 105 or private cloud 106, or another network.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processor set 110 may contain one or more processors and may be implemented using one or more heterogeneous processor systems. A processor in processor set 110 may be a single- or multi-core processor or a graphics processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Operating system 122 runs on computer 101. Operating system 122 coordinates and provides control of various components within computer 101. Instructions for operating system 122 are located on storage devices, such as persistent storage 113, and may be loaded into at least one of one or more memories, such as volatile memory 112, for execution by processor set 110.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of application 200 may be stored in persistent storage 113 and may be loaded into at least one of one or more memories, such as volatile memory 112, for execution by processor set 110. The processes of the illustrative embodiments may be performed by processor set 110 using computer implemented instructions, which may be located in a memory, such as, for example, volatile memory 112, persistent storage 113, or in one or more peripheral devices in peripheral device set 114. Furthermore, in one case, application 200 may be downloaded over WAN 102 from remote server 104, where similar code is stored on a storage device. In another case, application 200 may be downloaded over WAN 102 to remote server 104, where downloaded code is stored on a storage device.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, user interface (UI) device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Internet of Things (IoT) sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any WAN (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
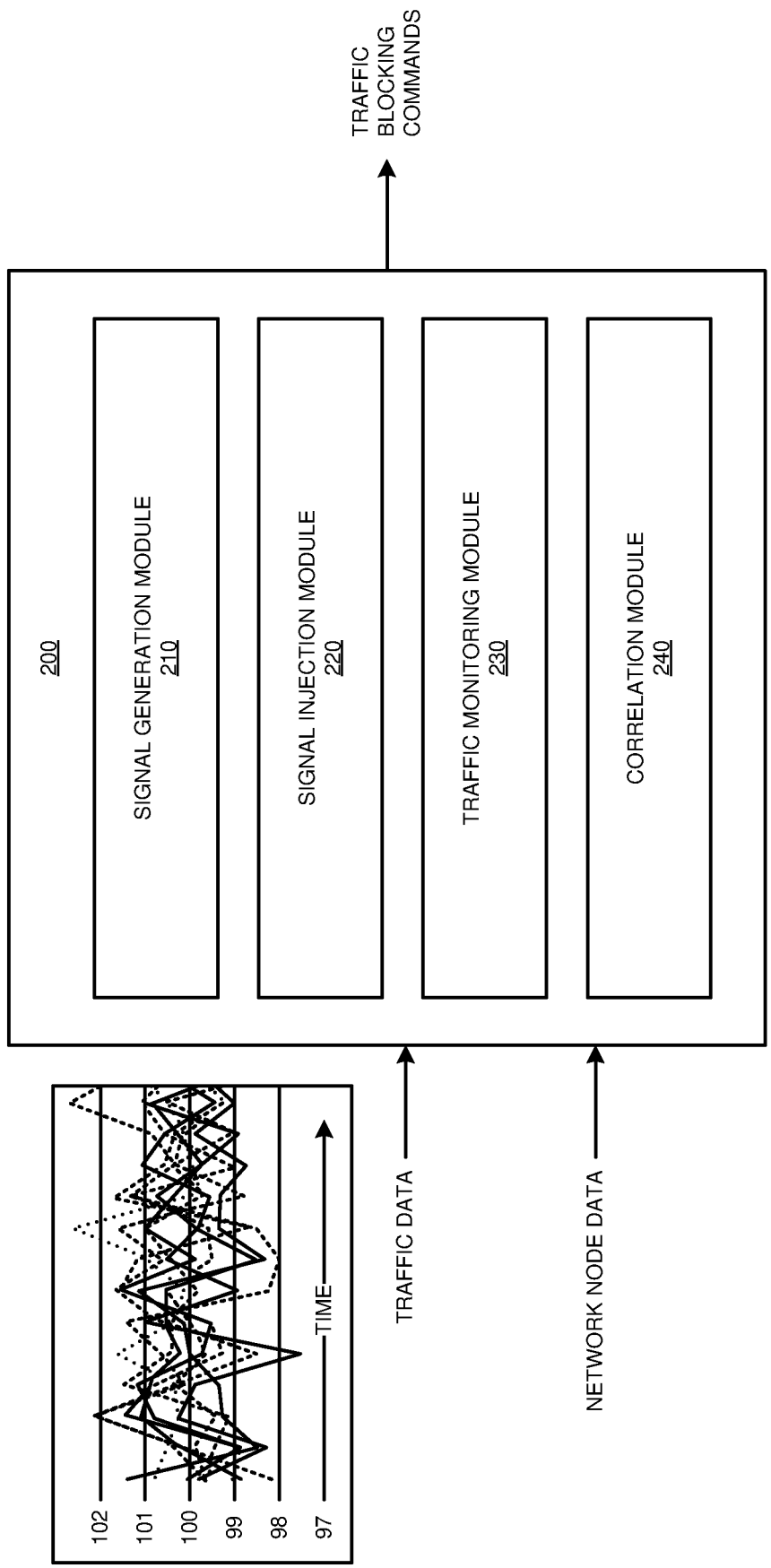
FIG. 2 depicts a block diagram of an example configuration for signal based node relationship identification in accordance with an illustrative embodiment.

With reference to FIG. 2, this figure depicts a block diagram of an example configuration for signal based node relationship identification in accordance with an illustrative embodiment. Application 200 is the same as application 200 in FIG. 1.

Application 200 receives network node data, which is data of one or more nodes in a network application 200 is analyzing. Application 200 also receives traffic data from the network being analyzed.

Signal generation module 210 generates a signal to be injected into a network node. The signal indicates when traffic is to be blocked and unblocked from a network node. Thus, to generate a signal, one implementation of module 210 uses a pre-defined time interval—e.g., every five minutes. To generate a signal, another implementation of module 210 uses a set of pre-defined time intervals—e.g., three minutes, then ten minutes, then twenty minutes, then five minutes, then repeating the entire sequence. To generate a signal, another implementation of module 210 uses one or more randomly-generated time intervals, using time interval values generated using a pseudo-random number generator. The signal also indicates the traffic volume to be blocked from a network node. Thus, to generate a signal, one implementation of module 210 uses a pre-defined traffic volume—e.g., 100%. To generate a signal, another implementation of module 210 uses a set of pre-defined traffic volumes—e.g., 50%, then 75%, then 100%, then repeating the entire sequence. To generate a signal, another implementation of module 210 uses one or more randomly-generated traffic volume percentages, using time interval values generated using a pseudo-random number generator. Another implementation of module 210 generates a signal to be injected into multiple network nodes, by combining generated signals injected into individual nodes. In one implementation of module 210, the signal ends after a predefined time period, while in another embodiment the signal does not end until stopped.

Signal injection module 220 injects the generated signal into a first network node in a network an embodiment is analyzing, by blocking, or preventing, data traffic from exiting the first network node in the predetermined pattern of the generated signal. For example, module 220 might block all data traffic from a domain to any other domain for one minute, every five minutes. As another example, module 220 might block, then unblock, all traffic from an IP address to any other IP address, switching between the blocked and unblocked states at time intervals of three minutes, then ten minutes, then twenty minutes, then five minutes, then repeating the sequence. As another example, module 220 might block 30% of the traffic from a particular IP address to another particular IP address for one hour, then block 50% of the traffic between the same IP addresses for a second hour. As another example, module 220 might block all United States traffic from a domain for one hour, then block all worldwide traffic from that domain for a second hour. As another example, module 220 might block a particular type of traffic, such as an outgoing connection request or a DNS lookup request. As will be apparent, the examples provided are only examples, and other combinations of node type, time interval, traffic volume, and number of nodes into which the signal is injected are also possible and contemplated within the scope of the illustrative embodiments.

Traffic monitoring module 230 monitors data flow within the set of network nodes while the generated signal is being injected, to detect effects of the injected signal.

From the monitored data flow, correlation module 240 detects a correlation with the generated signal. The correlation correlates, or identifies a relationship between, a second network node and the node into which the signal was injected. One implementation of module 240 uses a presently available statistical technique such as computing a cross-correlation to identify a similarity, above a threshold value, between the generated signal and a second signal. Another implementation of module 240 uses another presently available statistical technique to quantify the degree of alignment, correlation, or coincidence between two or more time-or space-dependent waveforms. In one implementation of module 240, the second signal comprises traffic data from the second network node. For example, if the signal is to block traffic to a particular IP address, the same traffic drops might be observed at the same timestamps at Domain D, indicating that Domain D typically is related to Domain A. In another implementation of module 240, the second signal comprises a particular type of traffic data from the second network node, such as an outgoing connection request to a specific IP address. In another implementation of module 240, the second signal comprises a particular type of system usage data from the second network node, such as processor usage. For example, if the signal is to block traffic from IP address A and there are corresponding drops in processor usage in another node, it is likely that a process running on the other node is dependent on traffic from IP Address A, and thus the two nodes are related.

Another implementation of module 240 uses a presently available statistical technique to identify a reversed pattern between the generated signal and a second signal. For example, if the signal is to block traffic from Domain A, traffic spikes might be observed at the same timestamps at Domain E. As another example, if the signal is to block traffic from IP address A, corresponding spikes in outgoing connection requests to IP Address B might be observed. A reversed pattern might be observed if a threat actor has a secondary infrastructure, so that blocking traffic from one node in the primary infrastructure drives traffic to one or nodes in a secondary infrastructure.

Another implementation of module 240 uses a presently available statistical technique to identify a time shift between the generated signal and a second signal. For example, if the signal is to periodically block traffic from Domain A, a traffic drop of the same frequency might be observed at Domain F. A time shift might be observed due a delayed reaction to the injected signal.

Another implementation of module 240 uses a presently available statistical technique to identify an effect of injecting the generated signal at a particular geographical location. For example, due to an adversary's particular infrastructure, the effect of blocking traffic from a node in the United States might be different from the effect of blocking traffic from a node in the United Kingdom.

Another implementation of module 240 uses a presently available statistical technique to identify an effect of injecting the generated signal on one or more network nodes already known to be malicious. For example, if traffic from one domain is blocked, it may take a botnet some time to deploy backup domains. However, known bad domains and the known relationships between them can be leveraged to create a model that recognizes sufficiently similar behavior in the time-series data resulting from an injected signal.

Another implementation of modules 230 and 240 monitors all data flow within a set of network nodes to identify an effect of injecting the generated signal. Another implementation of modules 230 and 240 monitors a portion of data flow within a set of network nodes, or all or a portion of data flow to or from particular nodes, to identify an effect of injecting the generated signal. Another implementation of modules 230 and 240 monitors a particular type of data flow, such as an outgoing connection request. Another implementation of modules 230 and 240 monitors data of a network node, such as processor usage of a node.

Module 240 associates the second network node with the first network node in a data structure maintaining data of relationships between nodes.

Application 200 uses the relationship data to select a network node into which to inject a signal in a subsequent iteration of the node relationship identification process described herein. For example, one iteration of signal injection might identify a group of IoC candidates, then additional iterations used to inject more signals in different locations or patterns, to eliminate IoC candidates or confirm others as actual IoCs with added confidence.

Application 200 uses one or more iterations of the node relationship identification process described herein to identify additional compromised network nodes as a botnet reconfigures itself. In particular, application 200 blocks traffic from exiting the second network node and injects a second generated signal onto the first network node while the second node is blocked, in a manner described herein. Application 200 detects, by monitoring data flow within the set of network nodes, a correlation between the second generated signal and a third network node in a manner described herein, and associates the third node with the first node.

Application 200 uses the relationship data to reconfigure a network to prevent one or more compromised nodes from affecting other nodes on the network. For example, once compromised nodes of a botnet are identified, traffic from the compromised nodes can be blocked, or a software reconfiguration can be performed on the compromised nodes to remove the botnet software.

Figure 3:
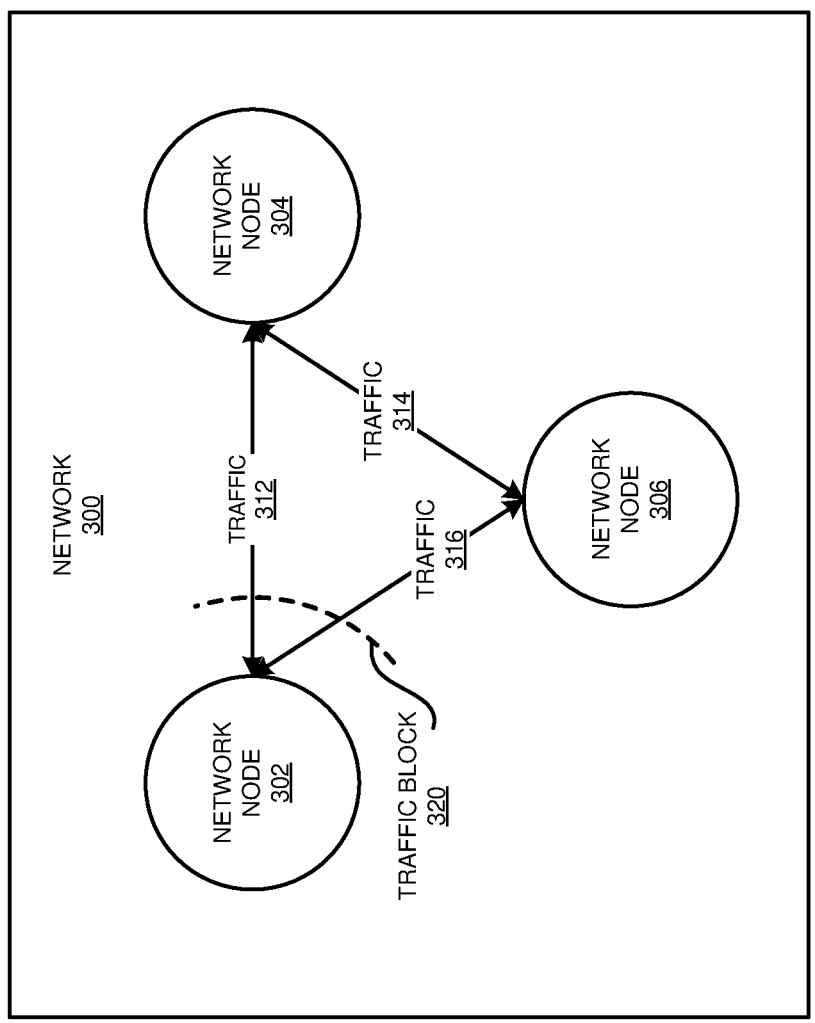
FIG. 3 depicts an example of signal based node relationship identification in accordance with an illustrative embodiment.

With reference to FIG. 3, this figure depicts an example of signal based node relationship identification in accordance with an illustrative embodiment. The example can be executed using application 200 in FIG. 2.

As depicted, network 300 includes network nodes 302, 304, and 306. Application 200 injects a generated signal onto network node 302, by implementing traffic block 320. Traffic block 320 blocks traffic 312 from nodes 302 to 304, and blocks traffic 316 from nodes 302 to 306. However, traffic 314 between nodes 304 and 306 is not blocked by traffic block 320.

Figure 4:
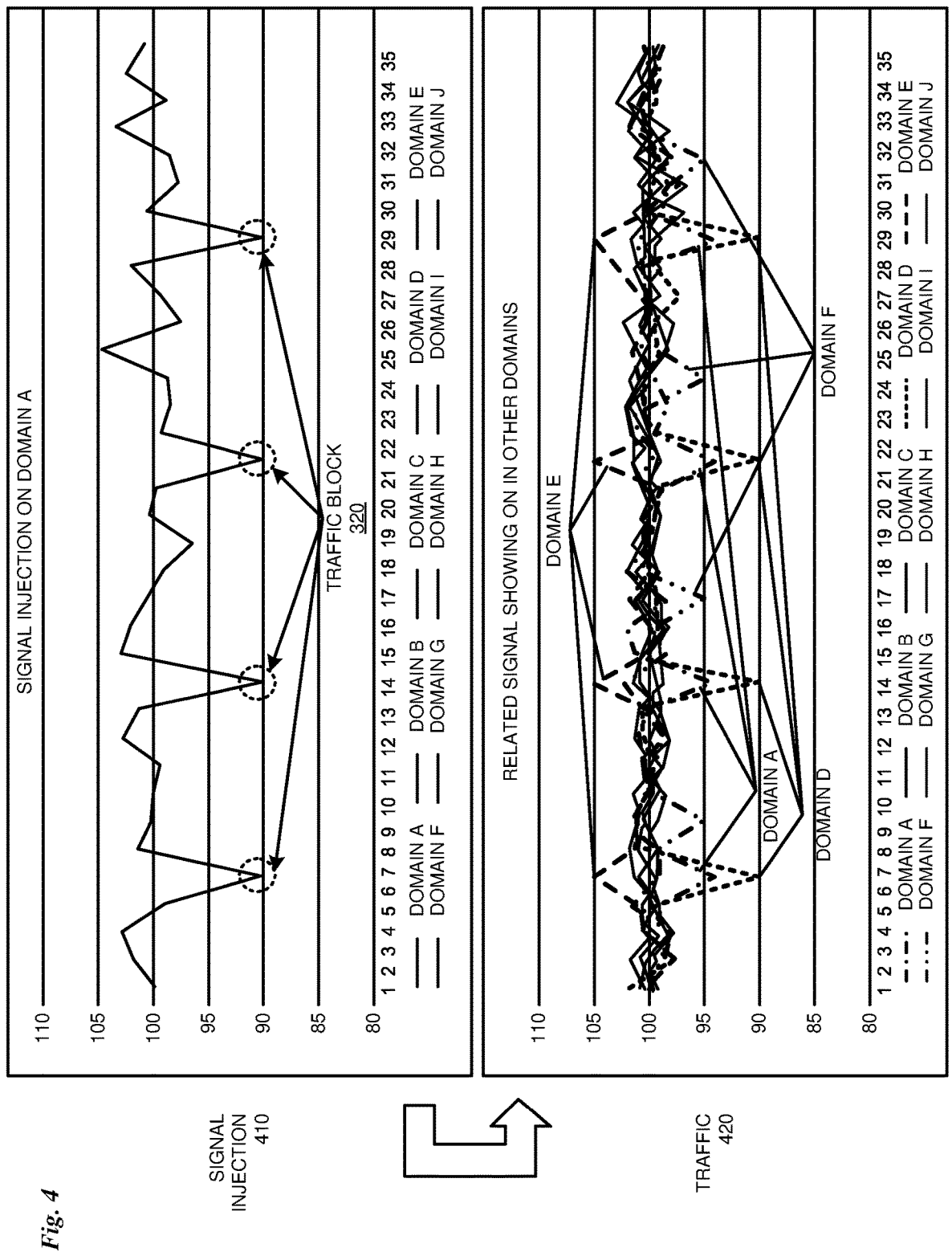
FIG. 4 depicts a continued example of signal based node relationship identification in accordance with an illustrative embodiment.

With reference to FIG. 4, this figure depicts a continued example of signal based node relationship identification in accordance with an illustrative embodiment. Traffic block 320 is the same as traffic block 320 in FIG. 3.

Signal injection 410 depicts a time series of traffic data from network node 302 (referred to in the graph as Domain A). Traffic block 320 indicates timestamps at which traffic drops due to activations of traffic block 320. Traffic 420 depicts time series of traffic data from network 300, including Domains D, E, and F (not shown in FIG. 3). In particular, Domain D traffic has above a threshold similarity with Domain A (where signal injection 410 occurred). Domain E traffic exhibits spikes correlated with the drops of Domain A traffic. Domain F traffic exhibits drops with an above-threshold consistent delay from the drops of Domain A.

Figure 5:
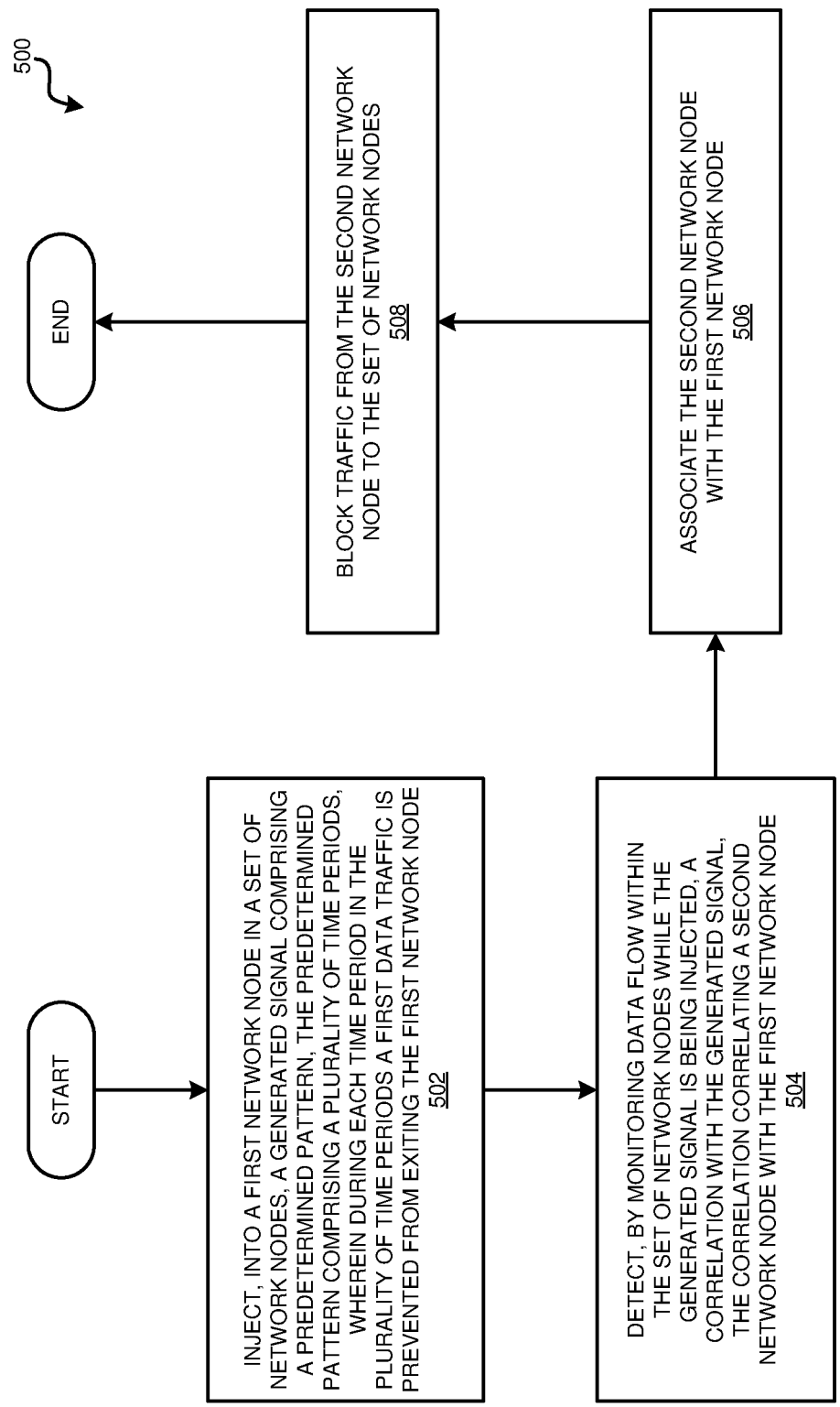
FIG. 5 depicts a flowchart of an example process for signal based node relationship identification in accordance with an illustrative embodiment.

With reference to FIG. 5, this figure depicts a flowchart of an example process for signal based node relationship identification in accordance with an illustrative embodiment. Process 500 can be implemented in application 200 in FIG. 2.

In block 502, the application injects, into a first network node in a set of network nodes, a generated signal comprising a predetermined pattern, the predetermined pattern comprising a plurality of time periods, wherein during each time period in the plurality of time periods a first data traffic is prevented from exiting the first network node. In block 504, the application detects, by monitoring data flow within the set of network nodes while the generated signal is being injected, a correlation with the generated signal, the correlation correlating a second network node with the first network node. In block 506, the application associates the second network node with the first network node. In block 508, the application blocks traffic from the second network node to the set of network nodes. Then the application ends.

Thus, a computer implemented method, system or apparatus, and computer program product are provided in the illustrative embodiments for signal based node relationship identification and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

What is claimed is:

1. A computer-implemented method comprising:
    injecting, into a first network node in a set of network nodes, a generated signal, the generated signal comprising a predetermined pattern, the predetermined pattern comprising a plurality of time periods, wherein during each time period in the plurality of time periods a first data traffic is prevented from exiting the first network node;
    detecting, by monitoring data flow within the set of network nodes while the generated signal is being injected, a correlation with the generated signal, the correlation correlating a second network node with the first network node;
    associating the second network node with the first network node; and
    blocking, responsive to the association, traffic from the second network node to the set of network nodes.

2. The computer-implemented method of claim 1, wherein the first data traffic comprises all data traffic from the first network node.

3. The computer-implemented method of claim 1, wherein the first data traffic comprises a subset of all data traffic from the first network node.

4. The computer-implemented method of claim 1, wherein detecting the correlation with the generated signal comprises computing a cross-correlation between an observed first time series and an observed second time series, the observed first time series comprising data flow data from the first network node during the injecting, the observed second time series comprising data from the second network node.

5. The computer-implemented method of claim 1, further comprising:
    injecting, onto the network node while traffic from the second network node is blocked, a second generated signal, the injecting comprising preventing a second data traffic from exiting the first network node in a second predetermined pattern;
    detecting, by monitoring data flow within the set of network nodes while the second generated signal is being injected, a second correlation with the second generated signal, the second correlation correlating a third network node with the first network node; and
    associating the third network node with the first network node.

6. The computer-implemented method of claim 1, further comprising:
    detecting, by monitoring processor usage within the set of network nodes while the generated signal is being injected, a third correlation with the generated signal, the third correlation correlating a fourth network node with the first network node; and
    associating the fourth network node with the first network node.

7. The computer-implemented method of claim 1, further comprising:
    detecting, by monitoring outgoing connection requests from the first network node while the generated signal is being injected, a fourth correlation with the generated signal, the fourth correlation correlating a fifth network node with the first network node; and
    associating the fifth network node with the first network node.

8. A computer program product comprising one or more computer readable storage medium, and program instructions collectively stored on the one or more computer readable storage medium, the program instructions executable by a processor to cause the processor to perform operations comprising:
    injecting, into a first network node in a set of network nodes, a generated signal, the generated signal comprising a predetermined pattern, the predetermined pattern comprising a plurality of time periods, wherein during each time period in the plurality of time periods a first data traffic is prevented from exiting the first network node;
    detecting, by monitoring data flow within the set of network nodes while the generated signal is being injected, a correlation with the generated signal, the correlation correlating a second network node with the first network node;
    associating the second network node with the first network node; and blocking, responsive to the association, traffic from the second network node to the set of network nodes.

9. The computer program product of claim 8, wherein the stored program instructions are stored in a computer readable storage device in a data processing system, and wherein the stored program instructions are transferred over a network from a remote data processing system.

10. The computer program product of claim 8, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
   program instructions to meter use of the program instructions associated with the request; and
   program instructions to generate an invoice based on the metered use.

11. The computer program product of claim 8, wherein the first data traffic comprises all data traffic from the first network node.

12. The computer program product of claim 8, wherein the first data traffic comprises a subset of all data traffic from the first network node.

13. The computer program product of claim 8, wherein detecting the correlation with the generated signal comprises computing a cross-correlation between an observed first time series and an observed second time series, the observed first time series comprising data flow data from the first network node during the injecting, the observed second time series comprising data from the second network node.

14. The computer program product of claim 8, further comprising:
   injecting, onto the network node while traffic from the second network node is blocked, a second generated signal, the injecting comprising preventing a second data traffic from exiting the first network node in a second predetermined pattern; and
   detecting, by monitoring data flow within the set of network nodes while the second generated signal is being injected, a second correlation with the second generated signal, the second correlation correlating a third network node with the first network node; and
   associating the third network node with the first network node.

15. The computer program product of claim 8, further comprising:
   detecting, by monitoring processor usage within the set of network nodes while the generated signal is being injected, a third correlation with the generated signal, the third correlation correlating a fourth network node with the first network node; and
   associating the fourth network node with the first network node.

16. The computer program product of claim 8, further comprising:
   detecting, by monitoring outgoing connection requests from the first network node while the generated signal is being injected, a fourth correlation with the generated signal, the fourth correlation correlating a fifth network node with the first network node; and
   associating the fifth network node with the first network node.

17. A computer system comprising a processor and one or more computer readable storage media, and program instructions collectively stored on the one or more computer readable storage media, the program instructions executable by the processor to cause the processor to perform operations comprising:
   injecting, into a first network node in a set of network nodes, a generated signal, the generated signal comprising a predetermined pattern, the predetermined pattern comprising a plurality of time periods, wherein during each time period in the plurality of time periods a first data traffic is prevented from exiting the first network node;
   detecting, by monitoring data flow within the set of network nodes while the generated signal is being injected, a correlation with the generated signal, the correlation correlating a second network node with the first network node;
   associating the second network node with the first network node; and
   blocking, responsive to the association, traffic from the second network node to the set of network nodes.

18. The computer system of claim 17, wherein the first data traffic comprises all data traffic from the first network node.

19. The computer system of claim 17, wherein the first data traffic comprises a subset of all data traffic from the first network node.

20. The computer system of claim 17, wherein detecting the correlation with the generated signal comprises computing a cross-correlation between an observed first time series and an observed second time series, the observed first time series comprising data flow data from the first network node during the injecting, the observed second time series comprising data from the second network node.

21. The computer system of claim 17, further comprising:
   injecting, onto the network node while traffic from the second network node is blocked, a second generated signal, the injecting comprising preventing a second data traffic from exiting the first network node in a second predetermined pattern;
   detecting, by monitoring data flow within the set of network nodes while the second generated signal is being injected, a second correlation with the second generated signal, the second correlation correlating a third network node with the first network node; and
   associating the third network node with the first network node.

22. The computer system of claim 17, further comprising:
   detecting, by monitoring processor usage within the set of network nodes while the generated signal is being injected, a third correlation with the generated signal, the third correlation correlating a fourth network node with the first network node; and
   associating the fourth network node with the first network node.

23. The computer system of claim 17, further comprising:
   detecting, by monitoring outgoing connection requests from the first network node while the generated signal is being injected, a fourth correlation with the generated signal, the fourth correlation correlating a fifth network node with the first network node; and
   associating the fifth network node with the first network node.

24. A computing environment comprising:
a shared pool of configurable computing resources;
at least one data processing system included in the configurable computing resources, the at least one data processing system comprising a processor unit and a data storage unit;
a service delivery model to deliver on-demand access to the shared pool of resources;
a metering capability to measure a service delivered via the service delivery model; and
program instructions collectively stored on one or more computer readable storage media, the program instructions executable by the processor unit to cause the processor unit to perform operations comprising:
injecting, into a first network node in a set of network nodes, a generated signal, the generated signal comprising a predetermined pattern, the predetermined pattern comprising a plurality of time periods, wherein during each time period in the plurality of time periods a first data traffic is prevented from exiting the first network node;
detecting, by monitoring data flow within the set of network nodes while the generated signal is being injected, a correlation with the generated signal, the correlation correlating a second network node with the first network node;
associating the second network node with the first network node; and
blocking, responsive to the association, traffic from the second network node to the set of network nodes.

25. A software service delivery computer system comprising:
a shared pool of configurable computing resources;
at least one data processing system included in the shared pool of configurable computing resources, the at least one data processing system comprising a processor unit and a data storage unit;
at least one remote server configured to enable data communication with the at least one data processing system;
wherein the data storage unit stores a set of program instructions, wherein the program instructions are executable by the processor unit to cause the processor unit to perform operations comprising:
injecting, into a first network node in a set of network nodes, a generated signal, the generated signal comprising a predetermined pattern, the predetermined pattern comprising a plurality of time periods, wherein during each time period in the plurality of time periods a first data traffic is prevented from exiting the first network node;
detecting, by monitoring data flow within the set of network nodes while the generated signal is being injected, a correlation with the generated signal, the correlation correlating a second network node with the first network node;
associating the second network node with the first network node; and
blocking, responsive to the association, traffic from the second network node to the set of network nodes.

* * * * *